US007786868B2

(12) United States Patent
Forster

(10) Patent No.: US 7,786,868 B2
(45) Date of Patent: Aug. 31, 2010

(54) RFID DEVICE WITH MULTIPLE PASSIVE OPERATION MODES

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 357 days.

(21) Appl. No.: 11/954,019

(22) Filed: Dec. 11, 2007

(65) Prior Publication Data

US 2009/0146785 A1   Jun. 11, 2009

(51) Int. Cl.
*G08B 13/14* (2006.01)
(52) U.S. Cl. .................................................. 340/572.1
(58) Field of Classification Search ... 340/572.1–572.9, 340/10.1, 10.3, 825.69
See application file for complete search history.

(56) References Cited

U.S. PATENT DOCUMENTS

| 5,497,140 | A  | 3/1996  | Tuttle |
| 5,822,685 | A  | 10/1998 | Forster |
| 6,046,668 | A  | 4/2000  | Forster |
| 6,281,797 | B1 | 8/2001  | Forster et al. |
| 6,369,772 | B1 | 4/2002  | Forster |
| 6,456,225 | B1 | 9/2002  | Forster |
| 6,480,062 | B1 | 11/2002 | Forster |
| 6,483,473 | B1 | 11/2002 | King et al. |
| 6,501,435 | B1 | 12/2002 | King et al. |
| 6,580,357 | B1 | 6/2003  | Forster et al. |
| 6,628,237 | B1 | 9/2003  | Forster et al. |
| 6,630,910 | B2 | 10/2003 | Forster et al. |
| 6,642,897 | B2 | 11/2003 | Forster et al. |
| 6,646,555 | B1 | 11/2003 | Forster et al. |
| 6,720,865 | B1 | 4/2004  | Forster et al. |
| 6,734,796 | B2 | 5/2004  | Forster et al. |
| 6,741,178 | B1 | 5/2004  | Tuttle |
| 6,744,367 | B1 | 6/2004  | Forster |
| 6,778,088 | B1 | 8/2004  | Forster |
| 6,799,027 | B1 | 9/2004  | Forster |
| 6,806,842 | B2 | 10/2004 | King et al. |
| 6,828,941 | B2 | 12/2004 | King et al. |
| 6,838,989 | B1 * | 1/2005 | Mays et al. .............. 340/572.1 |

(Continued)

FOREIGN PATENT DOCUMENTS

WO   2007/012031   1/2007

OTHER PUBLICATIONS

International Search Report and Written Opinion issued in corresponding PCT/US2008/086128 dated Apr. 14, 2009.

(Continued)

*Primary Examiner*—Phung Nguyen

(57) ABSTRACT

A radio frequency identification (RFID) device is capable of operating in multiple passive modes, in either a fully passive mode or a boosted passive mode. The device includes an RFID chip that is suitable for operation of passive RFID devices. An antenna is coupled to the chip for receiving radio frequency signals, such as those sent by a reader/detector device. In addition, the RFID device has an energy booster which may be used to boost the energy of signals received by the device, in order to enable operation at a reduced level of RF signal. The energy boost may be selectively applied in order to transform the passive RFID device into operating in a boosted passive mode. The energy booster may include a one-port transistor and an energy source that is used to power the transistor. The energy source may be a rechargeable energy source.

18 Claims, 4 Drawing Sheets

U.S. PATENT DOCUMENTS

| | | | |
|---|---|---|---|
| 6,847,912 B2 | 1/2005 | Forster | |
| 6,853,345 B2 | 2/2005 | King et al. | |
| 6,853,347 B2 | 2/2005 | Forster et al. | |
| 6,894,616 B1 | 5/2005 | Forster | |
| 6,895,226 B1 | 5/2005 | Forster et al. | |
| 6,895,655 B2 | 5/2005 | Forster et al. | |
| 6,903,704 B2 | 6/2005 | Forster et al. | |
| 6,914,562 B2 | 7/2005 | Forster | |
| 6,946,989 B2 * | 9/2005 | Vavik | 342/51 |
| 6,975,834 B1 | 12/2005 | Forster | |
| 6,985,119 B2 | 1/2006 | Forster et al. | |
| 7,046,122 B1 | 5/2006 | Forster | |
| 7,046,957 B1 | 5/2006 | Farr et al. | |
| 7,055,754 B2 | 6/2006 | Forster | |
| 7,057,562 B2 | 6/2006 | Forster et al. | |
| 7,059,518 B2 | 6/2006 | Forster | |
| 7,088,248 B2 | 8/2006 | Forster | |
| 7,093,345 B2 | 8/2006 | Forster et al. | |
| 7,098,850 B2 | 8/2006 | King et al. | |
| 7,102,520 B2 | 9/2006 | Liu et al. | |
| 7,109,867 B2 | 9/2006 | Forster | |
| 7,123,204 B2 * | 10/2006 | Forster et al. | 343/767 |
| 7,154,283 B1 | 12/2006 | Weakley et al. | |
| 7,158,033 B2 | 1/2007 | Forster | |
| 7,158,037 B2 | 1/2007 | Forster et al. | |
| 7,164,353 B2 | 1/2007 | Puleston et al. | |
| 7,170,415 B2 | 1/2007 | Forster | |
| 7,180,423 B2 | 2/2007 | Forster et al. | |
| 7,190,319 B2 | 3/2007 | Forster et al. | |
| 7,191,507 B2 | 3/2007 | Forster et al. | |
| 7,193,563 B2 | 3/2007 | King et al. | |
| 7,212,127 B2 | 5/2007 | Jacober et al. | |
| 7,215,976 B2 | 5/2007 | Brideglall | |
| 7,224,273 B2 | 5/2007 | Forster | |
| 7,224,280 B2 | 5/2007 | Ferguson et al. | |
| 7,225,992 B2 | 6/2007 | Forster | |
| 7,233,250 B2 | 6/2007 | Forster | |
| 7,234,642 B2 | 6/2007 | Forster | |
| 7,239,287 B2 | 7/2007 | Forster | |
| 7,273,173 B2 | 9/2007 | Forster | |
| 7,275,040 B2 | 9/2007 | Forster et al. | |
| 7,292,148 B2 | 11/2007 | Forster | |
| 7,295,117 B2 | 11/2007 | Forster et al. | |
| 7,298,266 B2 | 11/2007 | Forster | |
| 7,298,267 B2 | 11/2007 | Forster | |
| 7,298,330 B2 | 11/2007 | Forster et al. | |
| 7,298,343 B2 | 11/2007 | Forster et al. | |
| 7,306,162 B2 | 12/2007 | Forster | |
| 7,307,527 B2 | 12/2007 | Forster | |
| 2003/0017804 A1 * | 1/2003 | Heinrich et al. | 455/41 |
| 2006/0001525 A1 | 1/2006 | Nitzan et al. | |
| 2006/0012464 A1 | 1/2006 | Nitzan et al. | |
| 2006/0238308 A1 * | 10/2006 | Mickle et al. | 340/10.33 |

OTHER PUBLICATIONS

Sorrells, Pete, "Passive RFID Basics", Microchip Technology Inc., 1998m pp. 1-5.

* cited by examiner

RFID DEVICE WITH MULTIPLE PASSIVE OPERATION MODES

BACKGROUND OF THE INVENTION

1. Field of the Invention

The invention is in the field of radio frequency identification (RFID) devices.

2. Description of the Related Art

Radio frequency identification (RFID) tags and labels (collectively referred to herein as "devices") are widely used to associate an object with an identification code or other information. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source for broadcasting signals, and passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and communicate enough information to uniquely identify individuals, packages, inventory and the like. RFID tags and labels also can be characterized as to those to which information is written only once (although the information may be read repeatedly), and those to which information may be written to repeatedly during use. For example, RFID tags may store environmental data (that may be detected by an associated sensor), logistical histories, state data, etc.

RFID devices further can be characterized as passive, semi-passive, and active RFID devices. Passive RFID devices have no internal power supply. Power for operation of passive RFID devices is provided by the energy in an incoming radio frequency signal received by the device. Most passive RFID devices signal by backscattering the carrier wave from an RF reader. Passive RFID devices have the advantage of simplicity and long life, although performance of them may be limited.

Active RFID devices have their own internal power source, which is used to power an integrated circuit or chip in the device, and broadcast a separate signal. Active RFID devices may be more reliable than passive RFID devices. There may be fewer errors in communication between active tags and readers. Active tags may also transmit at higher power levels than passive RFID devices. However, active RFID devices have the disadvantage of requiring a power source in order to communicate.

Semi-passive RFID devices also have a power source, but unlike active devices this power source is only used to provide that energy for internal operation of the device. In other words, semi-passive devices do not broadcast their own signals, as active RFID devices do. Semi-passive RFID devices usually communicate in a manner similar to that of passive RFID devices, by backscattering an incoming RF carrier signal. Thus semi-passive devices share with active RFID devices the disadvantage of requiring a power source, while ameliorating only some of the disadvantages of passive device communication.

From the foregoing it will be appreciated that improvements in the area of RFID devices would be desirable.

SUMMARY OF THE INVENTION

According to an aspect of the invention, an RFID device is able to selectively operate in multiple passive modes of operation.

According to another aspect of the invention, an RFID device is able to selectively operate in either a passive mode or a boosted passive mode.

According to yet another aspect of the invention, an RFID device has an energy booster for selectively amplifying incoming signals, to enable operation of a passive RFID chip of the device at lower energy levels. The device may also be operated in a fully passive mode with the energy booster providing no amplification or gain of incoming signals.

According to still another aspect of the invention, a radio frequency identification (RFID) device includes: a passive RFID chip configured to communicate with a reader by backscatter modulation, without transmitting its own signal; an antenna operatively coupled to the passive RFID chip; and an energy booster operatively coupled to the antenna and the chip, wherein the energy booster is configured to selectively amplify incoming energy received by the antenna and sent to the passive RFID chip. The RFID device operates in a fully passive mode, communicating by backscatter modulation and relying upon incident incoming energy from the antenna to provide substantially all the power for operation of the chip, when the energy booster is not amplifying the incoming energy. The RFID device operates as a boosted passive mode when the energy boosters is boosting the incoming energy.

According to a further aspect of the invention, a method of communicating using a radio frequency identification (RFID) device includes the steps of: receiving energy at an antenna of the RFID device; boosting the received energy from the antenna using an energy booster of the RFID device; forwarding the boosted energy to an RFID chip of the RFID device; and using the RFID chip to communicate using backscattering, with the RFID chip powered with the boosted energy.

According to a still further aspect of the invention, a radio frequency identification (RFID) device includes: an RFID chip configured to communicate with a reader by backscatter modulation, without transmitting its own signal; an antenna operatively coupled to the RFID chip; an energy booster operatively coupled to the antenna and the chip, wherein the energy booster is configured to selectively amplify incoming energy received by the antenna and sent to the RFID chip. The energy booster enables the RFID device to communicate in multiple passive communication modes.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

A radio frequency identification (RFID) device is capable of operating in multiple passive modes, in either a fully passive mode or a boosted passive mode. The device includes an RFID chip that is suitable for operation of passive RFID devices. An antenna is coupled to the chip for receiving radio frequency signals, such as those sent by a reader/detector device. In addition, the RFID device has an energy booster which may be used to boost the energy of signals received by the device, in order to enable operation at a reduced level of RF signal. The energy boost may be selectively applied in order to transform the passive RFID device into operating in a boosted passive mode. The energy booster may include a one-port amplifier made from a transistor and an energy source that is used to power the transistor. The energy source may be a rechargeable energy source, able to be recharged by a recharger of the RFID device. Although operation of the energy booster may enable better performance of the device in its boosted passive mode, the device is still fully functional as a passive RFID device even without operation of the energy booster.

The RFID device advantageously allows better performance than traditional fully passive devices, while still enabling operation as a fully passive device. The enhanced performance in the boosted passive mode of operation may be utilized until the energy source is exhausted, while still enabling subsequent operation in the fully passive mode, with no energy boost. In addition the boosted passive mode may be selectively employed only under certain circumstances, such as when certain criteria are met, so as to extend the service life of the energy source.

Figure 1:
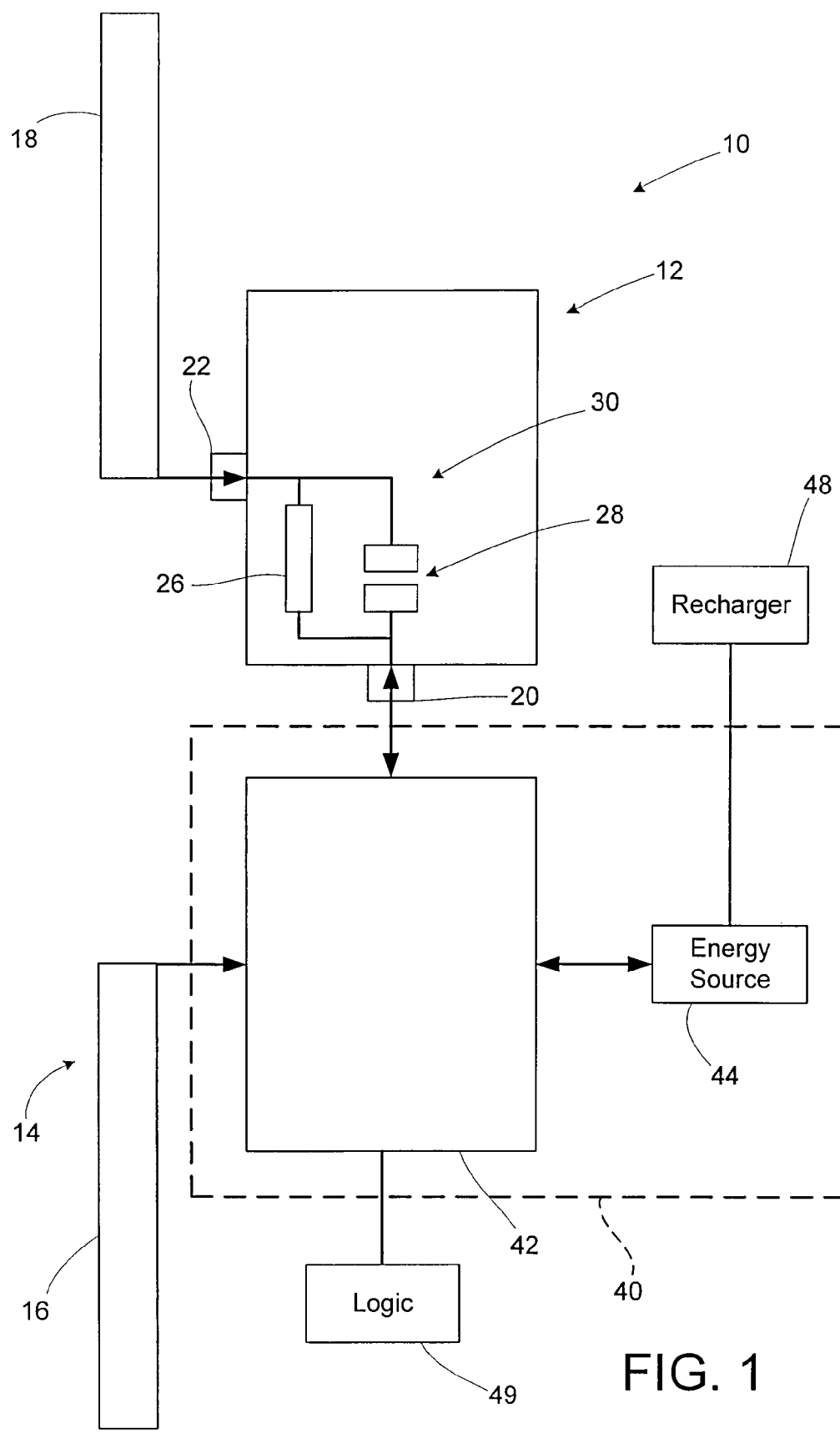
FIG. 1 is a schematic diagram of an RFID device in accordance with an embodiment of the present invention.

Referring to FIG. 1, a radio frequency identification (RFID) device 10 includes a passive RFID chip 12 and an antenna 14. The antenna 14 includes a pair of antenna elements 16 and 18 that are coupled to respective input contacts 20 and 22 of the passive RFID chip 12. A passive RFID chip is defined herein as a chip configured to communicate with a reader by backscatter modulation, without transmitting or broadcasting its own signal. The passive RFID chip 12 has a resistor 26 and a capacitor 28. A resistor 26 and a capacitor 28 can be used as a simplified model of the input impedance of an RFID chip, and together represent a complex internal impedance 30 of the passive RFID chip 12, although it will be appreciated that the actual input impedance varies depending on chip design and is a non linear function of input power.

The antenna 14 is shown as a dipole antenna, with a pair of separate antenna elements 16 and 18. It will be appreciated that alternatively the antenna 14 may have a variety of other configurations, including that of a coil antenna, a slot antenna, a loop antenna, or a patch antenna, depending on the intended application for the device. Other antenna configurations are described in U.S. Pat. No. 7,298,343, the description and figures of which are hereby incorporated by reference herein.

The RFID device 10 also includes an energy booster 40 for boosting or amplifying the incident energy received at one of the antenna elements 16. The energy booster 40 includes a one-port amplifier 42 and an energy source 44. The one-port amplifier 42 is placed between the antenna element 16 and the input contact 20, and may be used to selectively amplify or boost energy incident on the antenna element 16. The amplifier 42 may be any of a variety of suitable one-port amplifiers, examples including a transistor biased as a negative resistor, or a Gunn diode. The amplifier 42 is used to selectively amplify or boost incoming energy from the antenna element 16. Such energy may be generated by an RF reader as part of a process for interrogating passive or semi-passive devices, or more generally for communicating with RFID devices.

Figure 2:
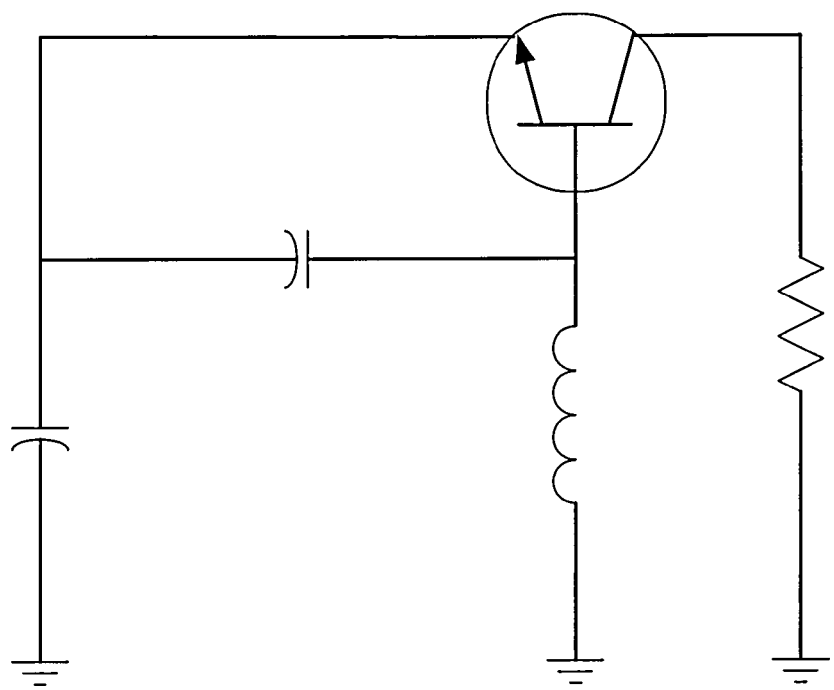
FIG. 2 is a circuit diagram illustrating a feedback configuration for creating a negative resistor for use in the RFID device of FIG. 1.
Figure 3:
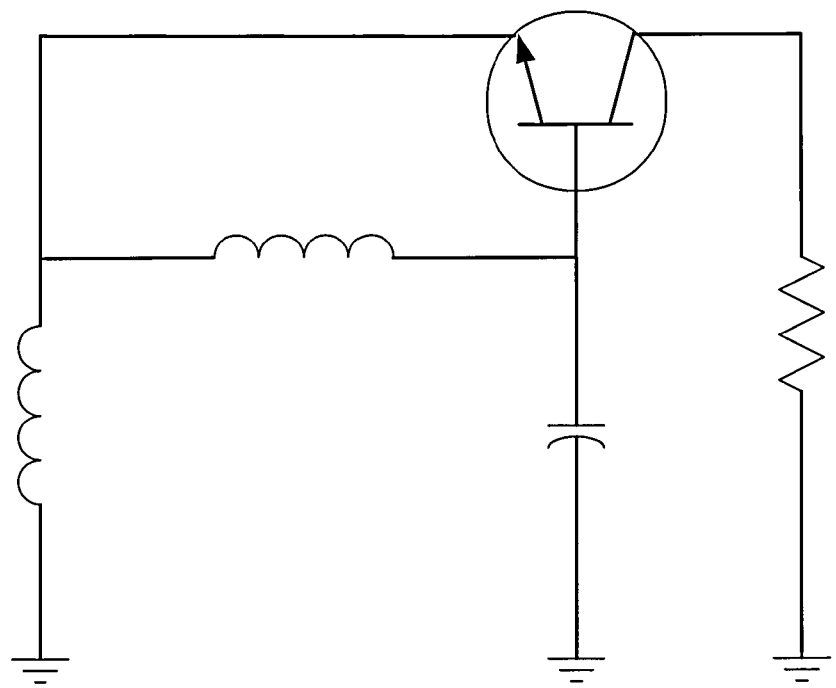
FIG. 3 is a circuit diagram illustrating another feedback configuration for creating a negative resistor for use in the RFID device of FIG. 1.

Negative resistors used as the amplifier 42 may be configured by taking a three terminal active device and applying the correct amount of feedback to a common port, such that the magnitude of the input reflection coefficient becomes greater than one. At low frequencies, with a simple bipolar transistor, feedback between the emitter terminal and the base via a capacitor, with the collector held at a defined voltage, can transform the resistive component looking into the base into a negative resistor. This structure is commonly used to make oscillators, in particular Colpitts oscillators. At higher frequencies the feedback can be achieved by providing the correct loading to a one terminal of the device, with the feedback occurring via an intrinsic capacitor which is part of the device itself. For example loading the source of a GaAs field effect transistor (FET) can, via the source/gate capacitance, cause the device to present a negative resistance at the gate terminal at a specific frequency. FIGS. 2 and 3 illustrate two types of common feedback usually used to make oscillators, but which are also suitable to synthesize a negative resistance.

The energy source 44 for powering the amplifier 42 may be any of a variety of suitable compact energy sources. Examples include rechargeable and non-rechargeable batteries, capacitors, and supercapacitors. A recharger 48 may be used to recharge a rechargeable energy source 44. Examples of various types of rechargers include a piezoelectric generator driven by movement, a thermoelectric generator, or a photovoltaic element. In addition, it will be appreciated that excess incoming energy may be used to recharge the energy source 44.

With the amplifier 42 used to boost or amplify the energy of incoming RF energy incipient on the RF device 10, the RFID device 10 operates in a boosted passive mode. Boosted passive operation is defined herein as operation of an RFID device such that the device operates using energy for operation from RF signals received by the device, supplemented by energy from another source, such as an energy source that is part of the device. Boosted passive operation is contrasted with semi-passive operation in that boosted passive operation involves amplifying or boosting the energy incident on the device, while semi-passive operation involves use of a battery to maintain constant power to the circuitry of a chip. Semi-passive devices thus are able to perform continuous functions, such as monitoring environmental conditions. Also, the antennas for semi-passive devices may be configured without consideration for energy gathering.

Besides the boosted passive mode, the RFID device 10 is also capable of operating in a fully or purely passive mode. Fully or purely passive operation (sometimes referred to as simply "passive") is used herein refer to RFID device operation that relies upon energy for operation from RF signals received by the device, without any substantial supplementation by other energy sources. A fully passive device communicates by backscatter modulation, without transmitting or broadcasting its own signal. The amplifier 42 is selectively controlled to allow the RFID device 10 to operate either in a passive mode or in a boosted passive mode. The amount of boost or amplification provided by the amplifier 42 may be varied as circumstances require. Control of the amplifier 42 may be accomplished using logic 49. The logic 49 may be embodied in any of a variety of ways, such as on a circuit board or an integrated circuit that is part of the RFID device 10. Although the logic 49 is shown in the figure as separate from the passive RFID chip 12, it will be appreciated that the logic 49 may alternatively be built into or otherwise be a part of the RFID chip 12. The logic 49 may take any of a variety of physical forms, for example including such elements as various gates and filters, and various memories, to accomplish the processing operations described herein. The logic 49 may be configured to only provide amplification when the incoming signal on the antenna element 16 is at least some predetermined threshold energy. This prevents wasting energy in amplification when no signal is received, or when a very weak signal is received. After the threshold level of incoming RF energy is exceeded, the logic 49 may instruct the amplifier 42 to provide varying levels of gain in order to bring the signal strength up to what is necessary to provide sufficient energy for operating the RFID chip 12. Thus weak signals exceeding the energy threshold may have a relatively high gain provided by the amplifier 42 to provide them relatively large gain, while initially stronger signals may be boosted or amplified at a lower gain. For signals that by themselves provide ample energy to operate the RFID chip 12, the logic 49 may control the amplifier 42 so as to provide little or no gain.

As suggested elsewhere, strong signals may indeed be used to recharge the energy source 44, where the energy source 44 is a rechargeable energy source. It will be appreciated that the logic 49 may also be configured to limit use of gain from the amplifier 42 in other ways. For example, the logic 49 may be configured to only turn on gain in the amplifier 42 when a certain type of RF signal is received, for example signals with a certain frequency or having a certain encoding in them. As another alternative, the logic 49 may be configured to keep the amplifier 42 off when another RFID device is communicating over the same RF signal that is being received by the RFID device 10.

The energy booster 40 allows the RFID device 10 to operate with less input energy, improving performance and effectively increasing the read range of the RFID device 10 when the device is operating in a boosted passive mode. In addition to allowing the RFID device 10 to operate with less input energy, the amplifier 42 may enhance backscattered reflection signals produced by the RFID chip 12. Impedance of the negative resistor or other amplifier 42 may be selected in order to enhance reflection by the RFID device 10. Normally in RFID devices the modulated reflected signal from a device cannot exceed the amplitude of the incoming RF signal. With use of the negative resistor, the signal can be amplified, so in the modulation on or off state, the amplitude of the signal reradiated by the device is greater than that coming into the device.

Whether in the passive or boosted passive modes, the RFID device communications by backscatter modulation. In such a procedure the RFID tag 10 reflects the signal received from an RF reader, and selectively shunts its contacts to the antenna elements 14 and 16. This changes the amplitude of the combined reader signal and backscattered reflection. This change in amplitude is detected by the RF reader in order to protect the presence of a nearby RFID device. Various well-known coding methods are used to allow the RFID device to communicate data to the RF reader, by controlling the timing and duration of changes in the backscattered signal.

Figure 4:
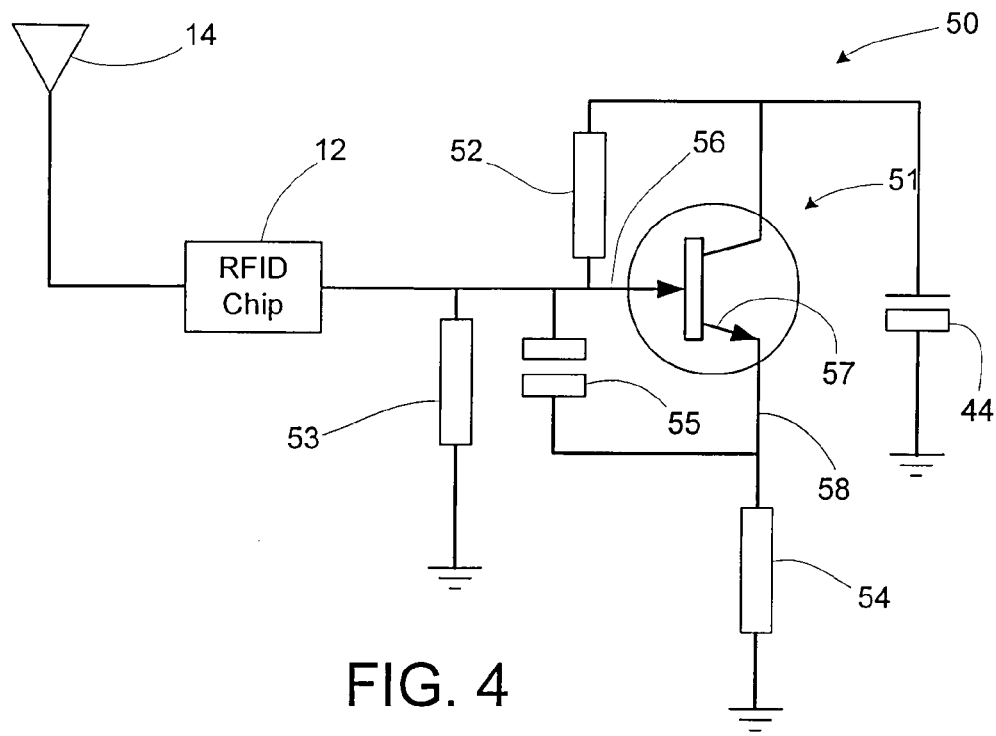
FIG. 4 is a circuit diagram illustrating a first embodiment recharger of the RFID device of FIG. 1.

FIGS. 4-7 illustrate some possible configurations for the recharger 48. In all of these illustrations the RF matching components have been omitted for clarity. In FIG. 4, an amplifier/recharger 50 is coupled to an RFID chip 12, and operates both as an amplifier and a recharger. The amplifier/recharger 50 includes a bi-polar transistor 51 biased and connected such that it acts as a negative resistor. The transistor 51 is connected to bias resistors 52, 53, and 54, and to a feedback capacitor 55. Power for the amplifier/recharger 50 is provided by the energy source 44 (e.g., a capacitor or battery). At high signal levels incoming into the antenna 14, a large RF voltage is provided on a base terminal 56 of the transistor 51. A diode junction 57 is provided between the base 56 and the collector 58, and produces a voltage at the collector 58, which charges the energy source 44.

Figure 5:
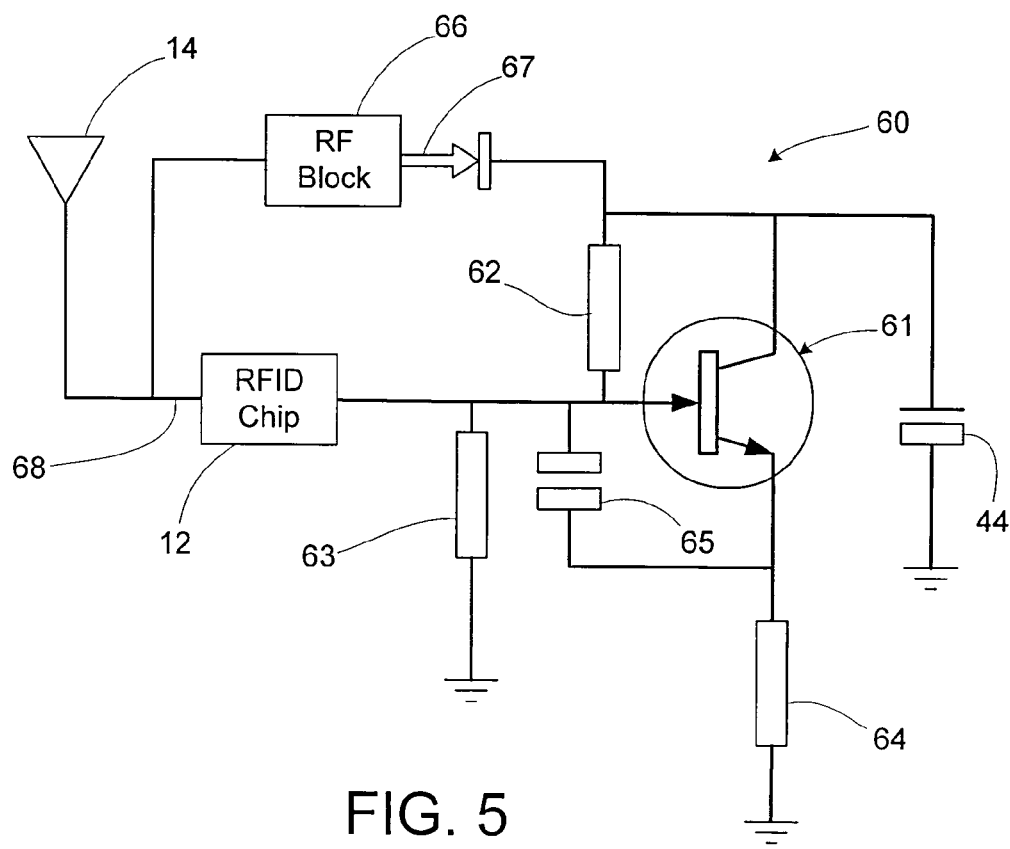
FIG. 5 is a circuit diagram illustrating a second embodiment recharger of the RFID device of FIG. 1.

FIG. 5 shows an amplifier/recharger 60 coupled to the RFID chip 12, the antenna 14, and the energy source 44. The amplifier/recharger 60 includes a transistor 61, bias resistors 62, 63, and 64, and a feedback capacitor 65. An RF block 66 and a diode 67 are coupled to an input 68 of the RFID chip 12. The rectified voltage of RF signals appears from the antenna 14 at the chip input 68. The RF block 66 may be an inductor of large value, used to isolate the diode 67 from the RFID chip 12. This keeps the RFID diode 67 from rectifying the RF signal itself, preventing degradation of sensitivity. When the DC voltage exceeds a predetermined limit excess power is diverted through the diode 67 to charge the energy source 44.

In an alternative configuration (not shown), the RFID chip 12 may have an additional port intended to provide bias for an external sensor or other device requiring power. The amplifier/recharger 60 may be used to gather and provide extra power for powering such an additional device.

As another alternative, the RF block 66 may be omitted, with the diode 67 having the threshold at which it rectifies changed by adjusting its impedance matching, so that the diode 67 is active only when the signal input is large. This allows the diode 67 to perform the same function as that of the RF block 66.

Figure 6:
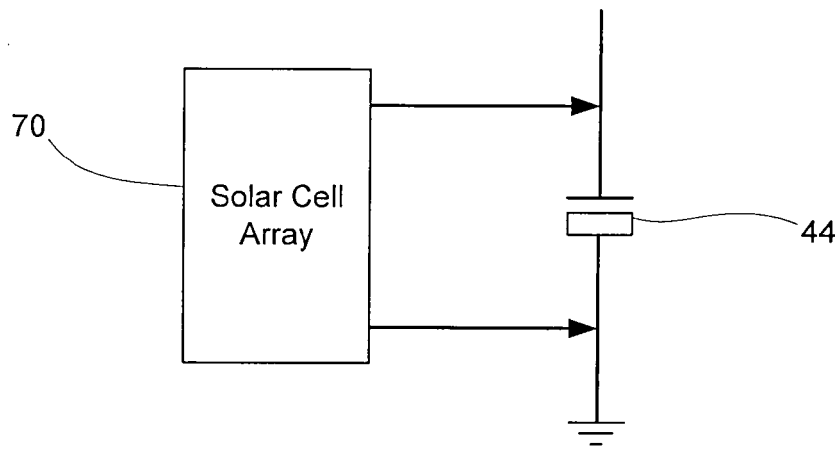
FIG. 6 is a schematic diagram illustrating a third embodiment recharger of the RFID device of FIG. 1.

FIG. 6 shows a solar cell array 70 coupled directly to the energy source 44. Power generated from the solar cell array 70 is directly used to recharge the energy source 44.

Figure 7:
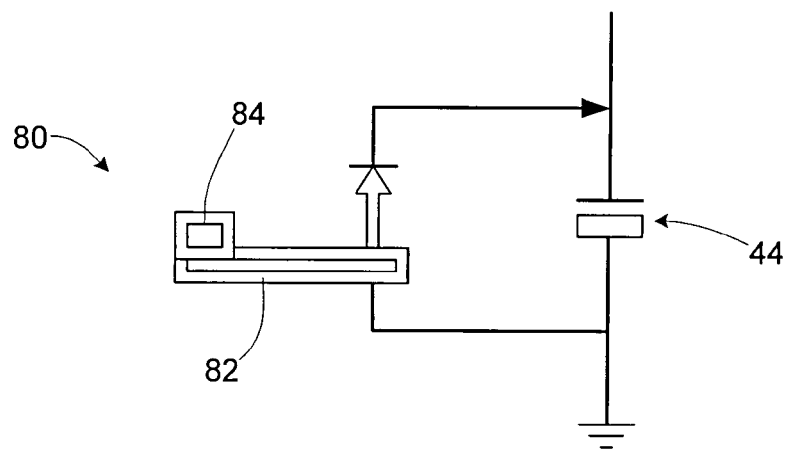
FIG. 7 is a schematic diagram illustrating a fourth embodiment recharger of the RFID device of FIG. 1.

FIG. 7 a piezoelectric device 80 is coupled to the energy source 44, to recharge the energy source 44. The piezoelectric device 80 may be piezo bi-morph structure, a piezoelectric material beam 82 with a weight 84 that deflects the beam 82 when the device 80 is moved. In one possible embodiment, an RFID inlay substrate may include polyvinylidene fluoride, a plastic that can become piezoelectric when exposed to a polarizing field at a defined temperature. The power generating device 80 may be made part of this inlay substrate.

From the above embodiments it will be appreciated that the way the recharger 48 transfers energy would vary depending on the scheme. For methods getting energy from a solar cell or vibration, for instance, the connection is largely independent of the RFID circuitry. When the method involves an RF charging scheme, a variety of configurations could be used, such as separate antennas with a separate rectifier for recharging, with the recharging antenna could be designed to operate at a different frequency (for example, a low frequency such as 13.56 MHz, with good penetration of products). Separate connections could be made to the same antenna at different impedance points, such that the RF voltage to make the rectifier work is only achieved at very high signal strengths.

Figure 8:
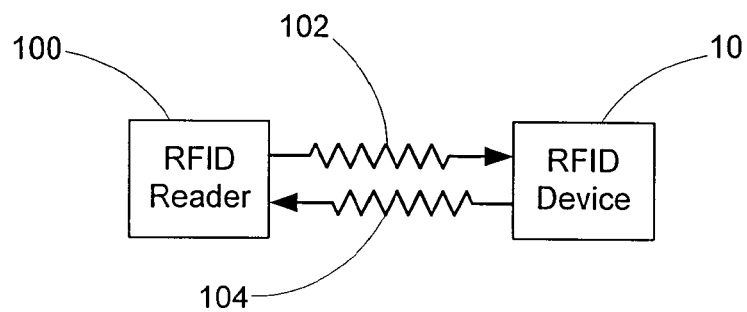
FIG. 8 is a schematic diagram of communication between an RF reader and the RFID device of FIG. 1.

FIG. 8 illustrates a communication process using the RFID device 10. An RF reader 100 sends out an RF signal 102. This RF signal 102 is received by the RFID device 10 which reflects the signal back as indicated by the reflected signal 104.

The RFID device 10 may be configured to operate at any of a variety of suitable frequencies, examples of such frequencies being 2.45 GHz, 125 kHz, and 13.56 MHz. It will be appreciated that the device 10 may be configured to operate at any of a wide range of frequencies, for example including the standard UHF bands, such as between 800 MHz and 1000 MHz.

The RFID device 10 provides many advantages over prior devices. It allows boosted passive operation to be chosen as an option selectively entered into by an otherwise passive RFID device. As described above, such boosted passive operation may enhance the range and other performance characteristics of the RFID device. However, the device continues to have the ability to function in its fully passive mode. This is true even when the device is no longer capable of entering into the boosted passive mode, such as when the battery or other energy source has been depleted. This fully passive mode allows continuation of some operability of the RFID device 10 even when enhanced operability is no longer available.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radio frequency identification (RFID) device comprising:
   a passive RFID chip configured to communicate with a reader by backscatter modulation, without transmitting its own signal;
   an antenna operatively coupled to the passive RFID chip; and
   an energy booster operatively coupled to the antenna and the chip, wherein the energy booster is configured to selectively amplify incoming energy received by the antenna and sent to the passive RFID chip;
   logic that controls the energy booster with the logic of the RFID device controlling a gain of the energy booster;
   wherein the RFID device operates in a fully passive mode, communicating by backscatter modulation and relying upon incident incoming energy from the antenna to provide substantially all the power for operation of the chip, when the energy booster is not amplifying the incoming energy; and
   wherein the RFID device operates in a boosted passive mode when the energy boosters is boosting the incoming energy.

2. The RFID device of claim 1, wherein the energy booster includes a one-port amplifier.

3. The RFID device of claim 2, wherein the energy booster also includes an energy source coupled to the amplifier, to power the amplifier.

4. The RFID device of claim 3, wherein the energy source includes a battery.

5. The RFID device of claim 4, wherein the battery is a rechargeable battery.

6. The RFID device of claim 3, wherein the energy source includes a capacitor.

7. The RFID device of claim 3, wherein the energy source includes a supercapacitor.

8. The RFID device of claim 3,
   wherein the energy source is a rechargeable energy source; and
   wherein the booster includes a recharger for recharging the rechargeable energy source.

9. The RFID device of claim 1, wherein the logic includes logic that amplifies the incoming energy only when the incoming energy exceeds a boost threshold.

10. The RFID device of claim 1, wherein the logic includes logic that selects an amount of gain as a function of an energy level of the incoming energy.

11. The RFID device of claim 1, wherein the energy booster includes a transistor biased as a negative resistor.

12. The RFID device of claim 1, wherein the energy booster includes a Gunn diode.

13. A method of communicating using a radio frequency identification (RFID) device, the method comprising:
    receiving energy at an antenna of the RFID device;
    boosting the received energy from the antenna using an energy booster of the RFID device wherein the boosting is a variable boosting, with logic of the RFID device controlling a gain of the boosting;
    forwarding the boosted energy to an RFID chip of the RFID device; and
    using the RFID chip to communicate using backscattering, with the RFID chip powered with the boosted energy.

14. The method of claim 13 wherein the logic performs the boosting only when an energy level of the received energy exceeds a threshold.

15. A radio frequency identification (RFID) device comprising:
    an RFID chip configured to communicate with a reader by backscatter modulation, without transmitting its own signal;
    an antenna operatively coupled to the RFID chip; and
    an energy booster operatively coupled to the antenna and the chip, wherein the energy booster is configured to selectively amplify incoming energy received by the antenna and sent to the RFID chip;
    logic that controls the energy booster with the logic of the RFID device controlling a gain of the energy booster;
    wherein the energy booster enables the RFID device to communicate in multiple passive communication modes.

16. The RFID device of claim 15, wherein the energy booster also includes an energy source coupled to an amplifier, to power the amplifier.

17. The RFID device of claim 16, wherein the energy source includes one of a capacitor, a supercapacitor, a battery or a rechargeable battery.

18. The RFID device of claim 15, wherein the energy booster includes a transistor biased as a negative resistor.

* * * * *